(12) United States Patent
Hsieh

(10) Patent No.: US 8,138,953 B2
(45) Date of Patent: Mar. 20, 2012

(54) METHOD FOR INPUTTING CHARACTER

(75) Inventor: Sung-Hai Hsieh, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 763 days.

(21) Appl. No.: 12/253,233

(22) Filed: Oct. 16, 2008

(65) Prior Publication Data

US 2009/0115644 A1 May 7, 2009

(30) Foreign Application Priority Data

Nov. 6, 2007 (TW) .............................. 96141849 A

(51) Int. Cl.
H03K 17/94 (2006.01)
(52) U.S. Cl. .......................................... 341/23; 341/24
(58) Field of Classification Search ..................... 341/22, 341/23, 34
See application file for complete search history.

(56) References Cited

U.S. PATENT DOCUMENTS

| | | | |
|---|---|---|---|
| 5,602,566 A * | 2/1997 | Motosyuku et al. | 345/684 |
| 6,731,227 B2 | 5/2004 | Horie | |
| 7,389,591 B2 * | 6/2008 | Jaiswal et al. | 33/366.11 |
| 7,860,644 B2 * | 12/2010 | Orr et al. | 701/200 |
| 2005/0052406 A1 | 3/2005 | Stephanick et al. | |
| 2009/0017880 A1 * | 1/2009 | Moore et al. | 455/575.1 |

FOREIGN PATENT DOCUMENTS

| | | |
|---|---|---|
| JP | 2004-287871 | 10/2004 |
| TW | I263144 | 10/2006 |
| TW | I271640 | 1/2007 |

OTHER PUBLICATIONS

"Office Action of Taiwan Counterpart Application", issued on Mar. 1, 2011, p. 1-p. 7.

* cited by examiner

Primary Examiner — Danny Nguyen
(74) Attorney, Agent, or Firm — Jianq Chyun IP Office

(57) ABSTRACT

A method for inputting a character adapted for a handheld electronic device is provided. In the present method, a reference plane is determined first. Then, a tilting angle and a tilting direction of the handheld electronic device deviating from the reference plane are detected. Then, the tilting direction is indicated, and an input of a key of the keypad is received. Finally, a character corresponding to the key at the tilting direction is displayed on the handheld electronic device. Therefore, only two actions including tilting the handheld electronic device and pressing the key are required for the users to complete the input of a character. As such, the method is intuitive, convenient, and fast for inputting the character.

14 Claims, 4 Drawing Sheets

METHOD FOR INPUTTING CHARACTER

CROSS-REFERENCE TO RELATED APPLICATION

This application claims the priority benefit of Taiwan application serial no. 96141849, filed on Nov. 6, 2007. The entirety of the above-mentioned patent application is hereby incorporated by reference herein and made a part of specification.

BACKGROUND OF THE INVENTION

1. Field of the Invention

The present invention generally relates to a method for inputting a character, and particularly, to a method of inputting a character according to a tilt direction of an apparatus.

2. Description of Related Art

As science and technology being rapidly developed, handheld electronic devices provide more and more functions to satisfy consumers' demands. A current typical handheld electronic device usually has basic functions including voice communication, short message service, and notepad, and some may even be further adapted for web browsing, and sending/receiving emails. The multiple functions bring conveniences to users, and such handheld electronic devices are also developed to be entertainment tools. In this manner, handheld electronic devices are considered as one kind of the most popular high-tech electronic products.

The foregoing functions require corresponding inputting interface for operation. Especially, when a handheld electronic device is operated for editing a telephone book, a short message, or an email, a great amount of characters are often needed to be inputted. However, such a handheld electronic device is usually slim and compact, and thus contains only a few keys which can be used for inputting the characters. For example, a handheld electronic device, such as a cell phone, or a personal digital assistant (PDA), can be inputted characters with keys, including numeral keys from 0 through 9, pound key, and star key, contained in a conventional keypad. In order to edit many characters, e.g., English characters or phonetic characters, these characters must be assigned to much less keys. In other words, each key of the keypad corresponds to more than one character. The characters can be respectively selected by pressing a single key for different times. This input mode is so called conventional multi-tap text input.

When operated in this mode, in order to input a character, a user first needs to locate a key corresponding to the character to be inputted, and then presses the key according to a position or an order of the character listed on the key. For example, as shown in FIG. 1, there is illustrated a conventional key pad. Referring to FIG. 1, the conventional key pad includes 12 keys, 101 through 112. When a user intends to input a character "y", the user needs to press the key 109, which has four characters "w", "x", "y", and "z" assigned thereto correspondingly in that order. The character "y" is the third one in the queue, and the user can input the character "y" by consecutively pressing the key 109 three times to switch the character from "w" to "x" and finally to "y".

Further, for example, when a user intends to input a word "on" which contains two characters "o" and "n", since both of the two characters "o" and "n" are assigned to the key 106, the user must press the key 106 three times to switch the character from "m" to "n" then to "o" for inputting the character "o". The user then has to hold for a certain period, and then presses the key 106 two times to switch the character from "m" to "n".

According to the foregoing, inputting one or more characters by pressing the keys requires repetitively pressing, and when inputting different characters assigned to a same key, it even requires a waiting period between the inputs of the two characters. This is inconvenient for the user to input characters.

SUMMARY OF THE INVENTION

Accordingly, the present invention is directed to a method for inputting a character, in which a handheld electronic device is tilted for inputting the character so as to simplify the procedure of inputting characters.

The present invention provides a method for inputting a character, adapted for a handheld electronic device having a keypad. In the method, a reference plane is determined first. Next, a tilting angle and a tilting direction of the handheld electronic device deviating from the reference plane are detected. Then, the tilting direction is indicated, and an input of a key of the keypad is received. Finally, a character corresponding to the key at the tilting direction is displayed on the handheld electronic device.

The present invention further provides another method for inputting a character, adapted for a handheld electronic device having a keypad. In the method, a reference plane is determined first. Then, a tilting angle and a tilting direction of the handheld electronic device deviating from the reference plane are detected when a key of the keypad is pressed. When the key is released, the tilting angle and the tilting direction are determined. Finally, a character corresponding to the key at the tilting direction is displayed on the handheld electronic device.

According to an embodiment of the invention, the foregoing step of detecting the tilting angle and tilting direction of the handheld electronic device deviating from the reference plane includes determining whether the tilting angle is within a predetermined range. When the tilting angle is within the predetermined range, the tilting direction is further identified as tilting forward, backward, leftward, or rightward, and indicated by arrows pointing to tilting directions. When the tilting angle is out of the predetermined range, the handheld electronic device is determined as not deviating from the reference plane. According to an aspect of the embodiment, the predetermined range is from 15° to 90°.

According to another embodiment of the present invention, the foregoing step of determining the reference plane includes: recording a plurality of tilting angles and the related tilting directions when the handheld electronic device is in operation; and determining the reference plane by calculating average values of the recorded tilting angles and the related tilting directions.

According to an embodiment, the present invention includes: detecting a tilting angle and a tilting direction of the handheld electronic device; and then receiving input of a key; and finally displaying a character corresponding to the key at the tilting direction. According to another embodiment, the present invention includes: receiving an input of a key; then detecting a tilting angle and a tilting direction of the handheld electronic device; and finally selecting a desired character according to the tilting direction of the handheld electronic device when the key is released. With the teaching of the foregoing two embodiments, the user may promptly input characters by conveniently tilting the handheld electronic device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
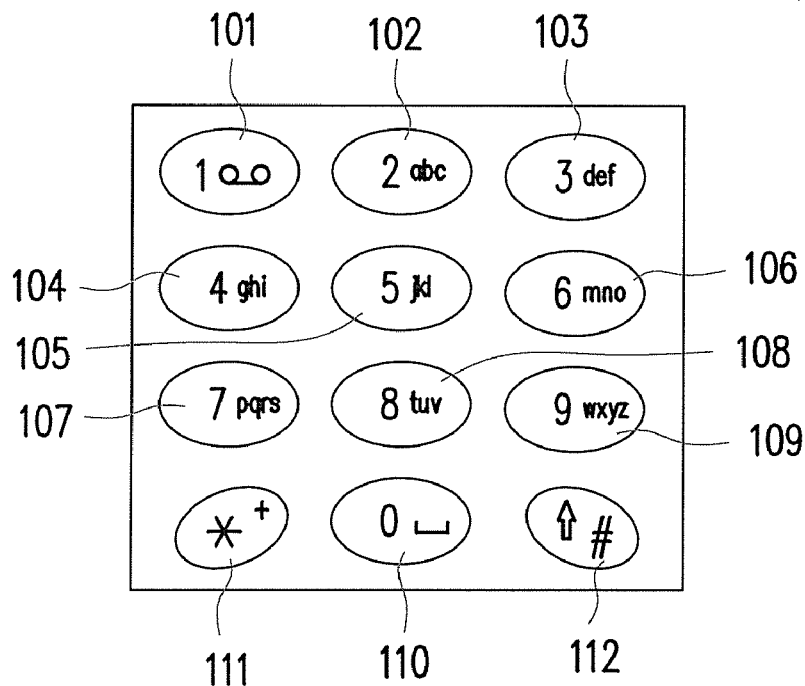
FIG. 1 is a schematic diagram illustrating a conventional keypad.

Reference will now be made in detail to the present preferred embodiments of the invention, examples of which are illustrated in the accompanying drawings. Wherever possible, the same reference numbers are used in the drawings and the description to refer to the same or like parts.

Conventional handheld electronic devices, which are restricted by their sizes and volumes, usually employ keypads for inputting characters. More than one, e.g., 3 to 5, characters are often assigned to a single key of the keypad. The present invention provides a method for inputting a character, in which a handheld electronic device is tilted in four directions, i.e., forward, backward, leftward, and rightward, each of which corresponding to a character, so as to select a desired character according to a tilting direction of the handheld electronic device.

First Embodiment

Figure 2:
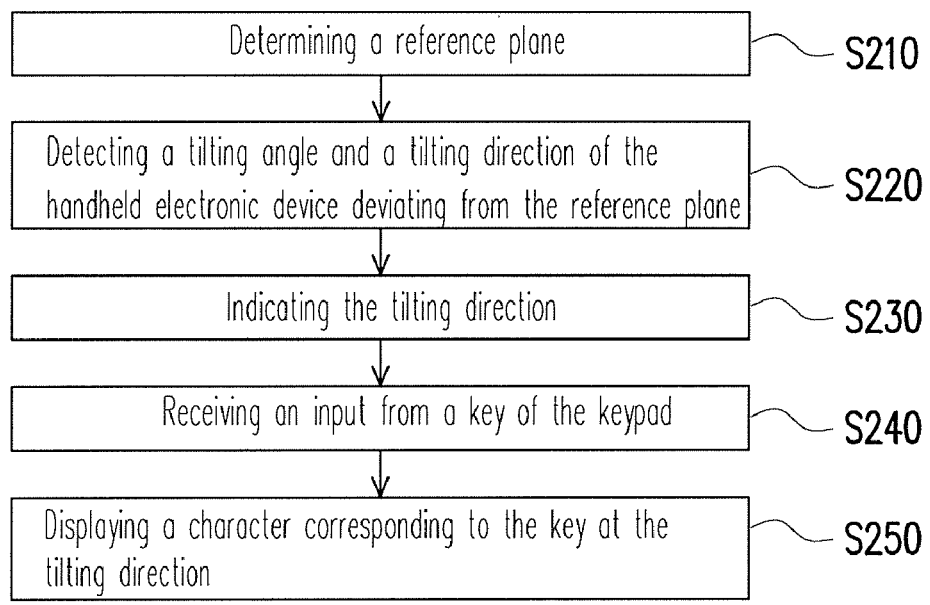
FIG. 2 is a flowchart illustrating a method for inputting a character according to a first embodiment of the present invention.
Figure 3:
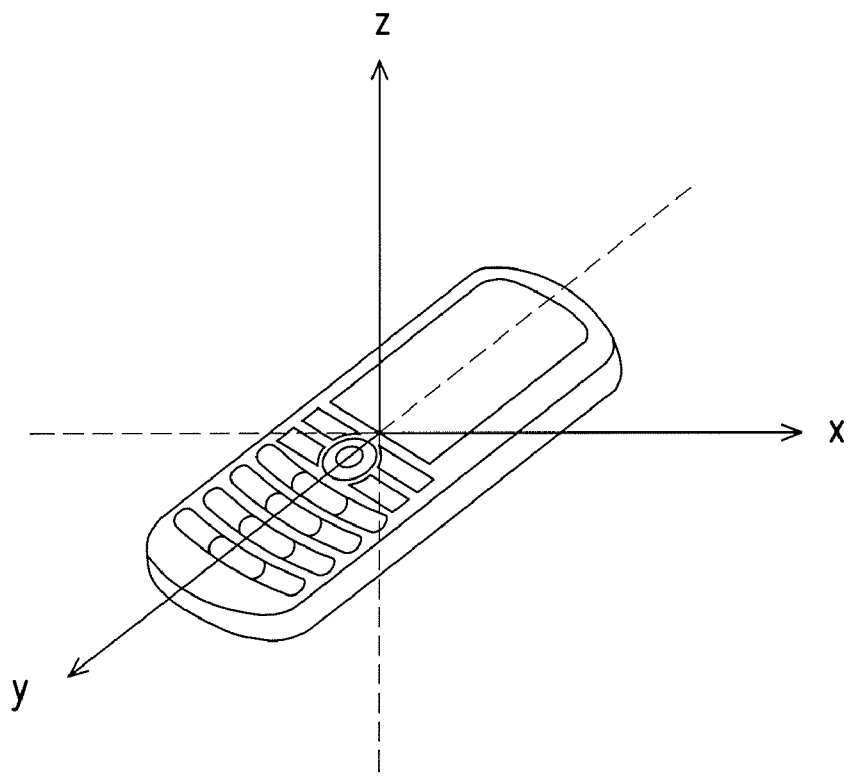
FIG. 3 is a schematic diagram illustrating a reference plane according to the first embodiment of the present invention.

FIG. 2 is a flowchart illustrating a method for inputting a character according to a first embodiment of the present invention. Referring to FIG. 2, first, at step S210, a system of a handheld electronic device sets a reference plane serving as a reference basis in determining whether the handheld electronic device is tilted or not. According to an aspect of the embodiment, the reference plane for example is a front surface, a back surface of the handheld electronic device, or any plane parallel therewith. For example, FIG. 3 is a schematic diagram illustrating a reference plane according to the first embodiment of the present invention. Referring to FIG. 3, there is shown a reference plane which is selected to be a front surface of the handheld electronic device. A central point of the reference plane is designated as an origin, and x axis, y axis, and z axis are set up according to the origin. The x axis represents a horizontal direction of the held handheld electronic device. The y axis represents a vertical direction of the held handheld electronic device. The z axis represents a direction perpendicular to the reference plane. As shown in FIG. 3, the x axis is used to determine the leftward tilting or the rightward tilting. The y axis is used to determine the forward tilting or the backward tilting.

It should be noted that most users operate the handheld electronic device with a certain pose and at a certain angle, and therefore according to an aspect of the embodiment, the reference plane is determined according to the user's behavior. For example, the tilting angle and tilting direction of the handheld electronic device corresponding to each use of the handheld electronic device are recorded, and then average values of all of the recorded tilting angles and tilting directions respectively are calculated, thereby determining the reference plane. According to another aspect of the embodiment, the tilting angles and tilting directions are detected only when a function of inputting characters is enabled, and the reference plane is then determined according to the tilting angles and tilting directions.

Then, at step S220, the tilting angle and tilting direction of the handheld electronic device deviating from the reference plane are detected. The tilting direction can be forward, backward, leftward, or rightward. In more details, after determining the reference plane, the system takes the reference plane as a benchmark and detects the tilting angle and tilting direction of the handheld electronic device deviating from the reference plane using a displacement sensor.

Further, in order to precisely determine the tilting direction of the handheld electronic device, e.g., forward, backward, leftward, rightward, or no tilting, which is desired by the user, the embodiment further includes defining a predetermined range of angles. The tilting direction of the handheld electronic device is determined according to a determination of whether the titling angle of the handheld electronic device is within the predetermined range of angle, e.g., 15° to 90°. According to an aspect of the embodiment, if the tilting angle is determined to be within the predetermined range of angle, the tilting direction is determined as tilting forward, backward, leftward, or rightward. Or otherwise, if the tilting angle is determined to be out of the predetermined range of angle, the handheld electronic device is determined as not deviating from the reference plane. It should also be noted that different users may use different ways for operation. When one operates a handheld electronic device according to the embodiment of the present invention, the handheld electronic device often more or less deviates along a horizontal direction and a vertical direction. According to an aspect of the embodiment, the present invention select the direction in which the handheld electronic device deviates most and the tilting angle thereof is within the predetermined range of angle as the tilting direction. As discussed above, each key can be operated in five statuses, including the four tilting directions and not tilting. As such, one single key can be used for inputting five different characters.

Then, at step S230, when the system detects the tilting direction of the handheld electronic device, it notifies the tilting direction to the user and allows the user to determine whether the tilting direction is desired. The system may notify the tilting direction by displaying words, pictures, or other characters on a screen of the handheld electronic device. The user then understands and confirms current tilting direction of the handheld electronic device, so as to adjust the tilting angle of the handheld electronic device accordingly.

For example, when the tilting angle is determined as within the predetermined range of angle, the tilting direction is then indicated by a direction symbol pointing to the tilting direction. The direction symbol for example can be an arrow pointing to forward, backward, leftward, or rightward. Further, when the handheld electronic device is determined as not deviating from the reference plane, i.e., the tilting angle is out of the predetermined range of angle, there is no direction symbol indicated.

Then, if the user determines that the tilting direction is correctly indicated, he can press the key corresponding to the character he intends to input. Then, at step S240, the handheld electronic device receives the input from the key of the keypad. Finally, at step S250, the character corresponds to the tilting direction and the key is displayed.

Figure 4:
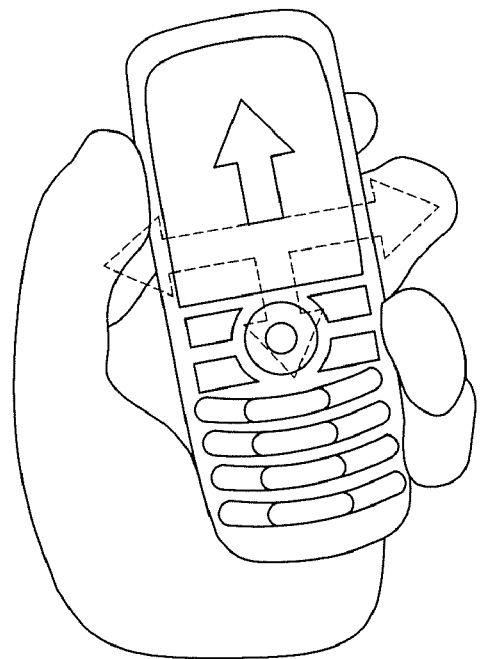
FIG. 4 is a schematic diagram illustrating a cell phone in operation according to the first embodiment of the present invention.

For the purpose of more clearly illustrating the present invention, a cell phone is taken as an example in more details for illustration below. FIG. 4 is a schematic diagram illustrating a cell phone in operation according to the first embodiment of the present invention. Referring to FIG. 4, there is shown a cross arrow indicating forward, backward, leftward, and rightward tilting directions. The user is allowed to intuitively tilt the cell phone and instructed by the cross arrow to be aware of a real tilting direction of the cell phone.

Figure 5:
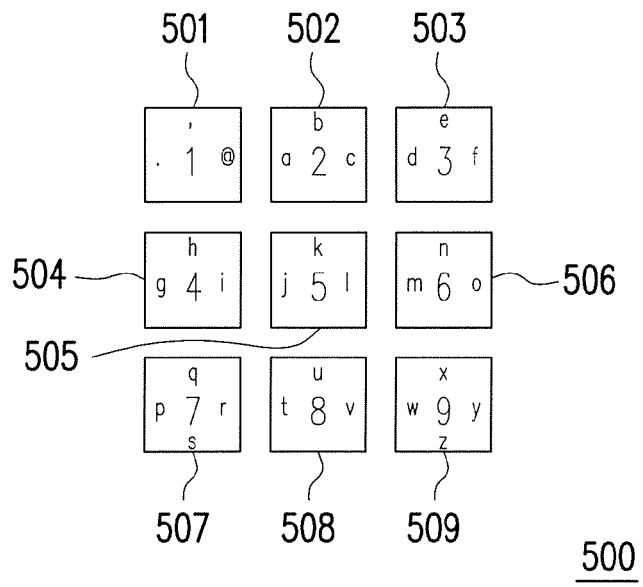
FIG. 5 is a schematic diagram of a keypad of the cell phone according to the first embodiment of the present invention.

FIG. 5 is a schematic diagram of a keypad of the cell phone according to the first embodiment of the present invention. Referring to FIG. 5, the keypad shown is a partially enlarged view of a keypad of FIG. 4 including keys 501 through 509, each of which corresponds to at least four characters.

Figure 6:
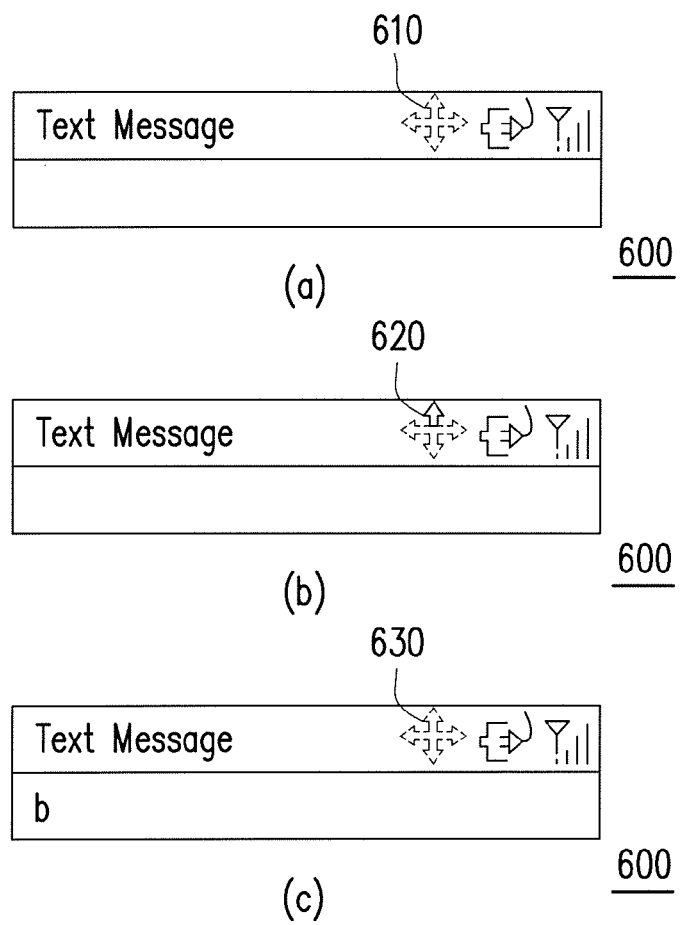
FIGS. 6(a) through 6(c) are schematic diagrams illustrating tilting directions indicated on a display of the cell phone according to the first embodiment of the present invention.

FIGS. 6(a) through 6(c) are schematic diagrams illustrating tilting directions indicated on a display of the cell phone according to the first embodiment of the present invention. Referring to FIGS. 6(a) through 6(c), there is shown a partially enlarged view of a text column 600 on the display of the cell phone as shown in FIG. 4. The text column 600 contains cross arrows 610 through 630. The cross arrows 610 through 630 are adapted for presenting a direction symbol in the text column 600 according to the real tilting direction.

Referring to FIGS. 4, 5, 6(a) through 6(c) together, at the beginning, the text column 600 has an original status as shown in FIG. 6(a), in which the cross arrow 610 represents that cell phone does not deviate. As shown in FIG. 6(a), the dashed line is used for indicating no direction symbol displayed thereby, or a less bright direction symbol displayed thereby.

Suppose the user intends to input a character "b", it can be found from the keypad 500 that the character "b" is assigned to a key 502, and other characters assigned to the key 502 include "2", "a", and "c". As indicated by the key 502, the character "b" corresponds to a forward direction. As such, the user may intuitively tilt forward the cell phone (i.e., the bottom approaching the user while the top departing from the user), as shown in FIG. 3 along the direction indicated by the solid arrow. Then, the text column 600 indicates a forward direction arrow as shown as the cross arrow 620 in FIG. 6(b). According to an embodiment of the present invention, the forward direction arrow may be displayed with a higher brightness or in a way of flickering.

After making sure that the tilting direction is correct, the user then presses the key 502, and the character "b" is then displayed in the text column 600. After pressing the key 502, the user instantly returns the cell phone to the original tilting angle to prepare for inputting another character. At this time, the text column 600 is recovered to the original status of the cross arrow 630. In such a way, the user is allowed to repetitively perform the foregoing steps of tilting, pressing a key, and recovering for inputting characters.

In summary, the above embodiment detects a tilting direction and a titling angle of a cell phone, and then receives an input of a key, so as to display a corresponding character. On another hand, the present invention further provides a method for inputting a character according to the spirit of the present invention, which is to be described below.

Second Embodiment

Figure 7:
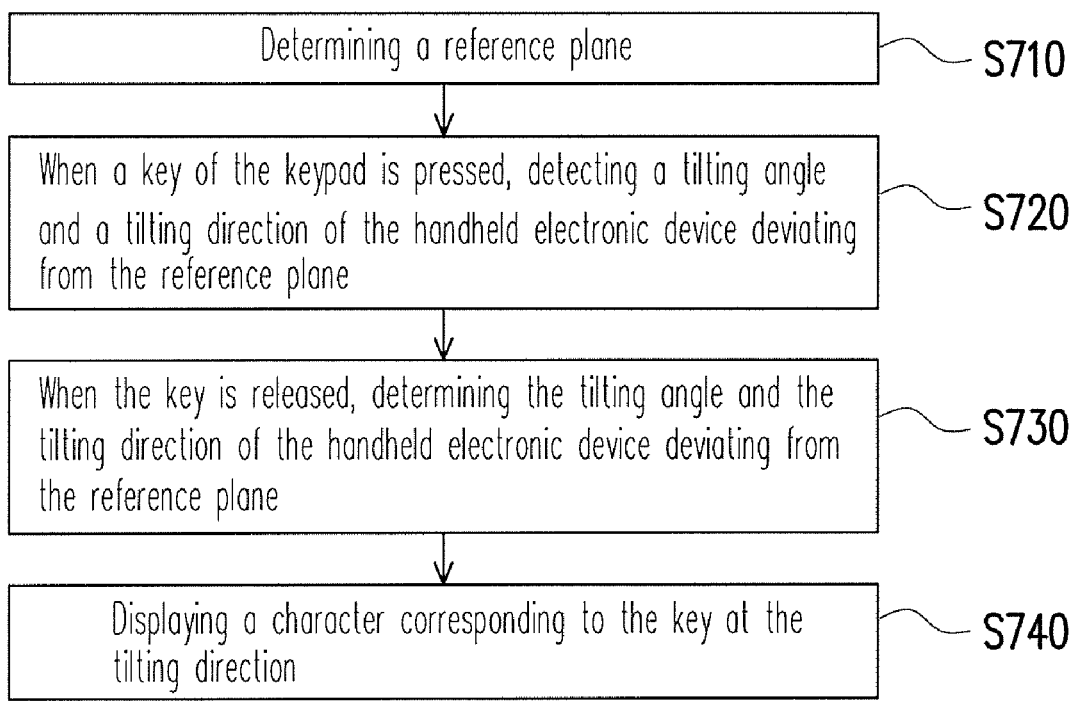
FIG. 7 is a flowchart illustrating a method for inputting a character according to a second embodiment of the present invention.

FIG. 7 is a flowchart illustrating a method for inputting a character according to a second embodiment of the present invention. Referring to FIG. 7, firstly, at step S710, a system of a handheld electronic device determines a reference plane serving as a reference basis in determining whether the handheld electronic device is tilted or not. According to an aspect of the embodiment, the reference plane for example is a front surface, a back surface of the handheld electronic device, or any plane parallel therewith.

Then, at step S720, when a certain key of a keypad of the handheld electronic device is pressed, a tilting angle and a tilting direction of the handheld electronic device are detected.

It should be noted that, the second embodiment according to the present invention differs from the first embodiment in that when the key keeps pressed and at the same time the step S720 is performed to tilt the handheld electronic device to a corresponding direction according to the character to be inputted, during which the handheld electronic device detects the titling angle and the tilting direction of the handheld electronic device deviating from the reference plane. According to an aspect of the embodiment, when it is tilted, the handheld electronic device is also used to indicate the titling direction so as to inform the user that whether the handheld electronic device is correctly tilted or not. Then, at step S730, upon releasing of the pressed key, the tilting angle and the tilting direction of the handheld electronic device deviating from the reference plane can be determined. Finally, at step S740, the character corresponding to the key at the tilting direction is displayed. The tilting direction hereby is the tilting direction of the handheld electronic device deviates when the key is released.

In summary, the current embodiment differs from the first embodiment in that the tilting angle and the tilting direction of the handheld electronic device are detected when a key keeps pressed, and only after the key is released, the character corresponding to the pressed key can be displayed.

In addition, considering the standpoint of a user, a further embodiment is to be described below regarding the difference between the first embodiment and the second embodiment. First, when a single character, e.g., "y" is to be inputted, it can be found that the character "y" is assigned to key 509 of the keypad 500 with a tilting direction of rightward direction. Referring to FIG. 5, in the first embodiment, the user tilts rightward the handheld electronic device, and at the same time a rightward tilting of the handheld electronic device is indicated on the screen of the handheld electronic device. Once the user confirms that the titling direction is correct, then he presses key 509, and the character "y" corresponding to the key 509 tilting at a rightward direction is then consequently displayed on the screen.

As to the second embodiment, the user alternatively presses the key 509 and holds the key 509 unreleased, and at the same time tilts rightward the handheld electronic device. When the user releases the key 509, the character "y" is then displayed on the screen.

On another hand, suppose a user intends to input more than one characters, for example "on", it can be found from the keypad 500 that characters "o" and "n" are both assigned to the key 506 while corresponding to a rightward tilting direction and a forward tilting direction respectively. As such, according to the first embodiment, after inputting the first character "o", the user can then tilts forward the handheld electronic device and presses the key 506, so as to consecutively input the character "n" without waiting for a certain period. As to the second embodiment, after inputting the first character "o", the user can presses the key 506 once again and tilts forward the handheld electronic device, so as to input the next character "n".

It should be noted that the current embodiment can also be used to input Chinese phonetic notations. For example, 37 phonetic notations are assigned to 10 keys of the keypad, in which 8 keys each has 4 phonetic notations assigned and the rest 2 keys each has 3 phonetic notations assigned. Similarly, the first embodiment and the second embodiment can also be used to input Chinese phonetic notations. Likewise, characters or symbols used in other countries can also be inputted according to the spirit of the present invention.

In summary, the method for inputting a character of the present invention utilizes a tilting angle and direction in combination with a corresponding key to input a character, so as to eliminate repetitive pressing of a single key, and thus is more convenient to operate. When characters assigned to a same key are to be inputted, there is no need to wait between the inputs of the characters, and therefore the input procedure has been simplified, and the characters can be input faster. Moreover, the characters are assigned to the keys at different directions, so as to allow the user to operate in an intuitive way.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A method for inputting a character, adapted for a handheld electronic device having a keypad, the method comprising:
    determining a reference plane;
    detecting a tilting angle and a tilting direction of the handheld electronic device deviating from the reference plane, the step of detecting the tilting angle and the tilting direction comprises:
        determining whether the tilting angle is within a predetermined range of angle;
        if the tilting angle is within the predetermined range of angle, then identifying the tilting direction as the direction of the handheld electronic device deviating from the reference plane; and
        if the tilting angle is out of the predetermined range of angle, then identifying the handheld electronic device as not deviating from the reference plane;
    indicating the tilting direction;
    receiving an input from a key of the keypad; and
    displaying a character corresponding to the key tilting at the tilting direction.

2. The method for inputting a character according to claim 1, wherein the tilting direction is one of a forward direction, a backward direction, a leftward direction and a rightward direction.

3. The method for inputting a character according to claim 1, wherein the predetermined range of angle is from 15° to 90°.

4. The method for inputting a character according to claim 1, wherein if the tilting angle is within the predetermined range of angle, the tilting direction is indicated by a direction symbol pointing to the titling direction.

5. The method for inputting a character according to claim 4, wherein if the tilting angle is out of the predetermined range of angle, the tilting direction is not indicated.

6. The method for inputting a character according to claim 4, wherein the direction symbol is one of a forward direction arrow, a backward direction arrow, a leftward direction arrow and a rightward direction arrow.

7. The method for inputting a character according to claim 1, wherein the step of determining the reference plane comprises:
    recording a plurality of tilting angles and related tilting directions obtained from different times of operation of the handheld electronic device; and
    calculating average values of the tilting angles and tilting directions, and determining the reference plane according to the average values.

8. A method for inputting a character, adapted for a handheld electronic device having a keypad, the method comprising:
    determining a reference plane;
    when a key of the keypad is pressed, detecting a tilting angle and a tilting direction of the handheld electronic device deviating from the reference plane;
    when the key is released, determining the tilting angle and the tilting direction of the handheld electronic device deviating from the reference plane, and the steps comprises:
        determining whether the tilting angle is within a predetermined range of angle;
        if the tilting angle is within the predetermined range of angle, then identifying the tilting direction as the direction of the handheld electronic device deviating from the reference plane; and
        if the tilting angle is out of the predetermined range of angle, then identifying the handheld electronic device as not deviating from the reference plane; and
    displaying a character corresponding to the key tilting at the tilting direction.

9. The method for inputting a character according to claim 8, further comprising:
    indicating the titling direction.

10. The method for inputting a character according to claim 9, wherein the tilting direction is one of a forward direction, a backward direction, a leftward direction and a rightward direction.

11. The method for inputting a character according to claim 8, wherein the predetermined range of angle is from 15° to 90°.

12. The method for inputting a character according to claim 8, wherein if the tilting angle is within the predetermined range of angle, the tilting direction is indicated by a direction symbol pointing to the titling direction.

13. The method for inputting a character according to claim 12, wherein if the tilting angle is out of the predetermined range of angle, the tilting direction is not indicated.

14. The method for inputting a character according to claim 12, wherein the direction symbol is one of a forward direction arrow, a backward direction arrow, a leftward direction arrow and a rightward direction arrow.

* * * * *